(12) United States Patent
Fukuma et al.

(10) Patent No.: US 12,456,765 B2
(45) Date of Patent: Oct. 28, 2025

(54) METHOD FOR REPLACING RECHARGEABLE BATTERY

(71) Applicants: PRIMEARTH EV ENERGY CO., LTD., Kosai (JP); TOYOTA JIDOSHA KABUSHIKI KAISHA, Toyota (JP)

(72) Inventors: Tamotsu Fukuma, Kosai (JP); Juni Yasoshima, Toyota (JP)

(73) Assignees: TOYOTA BATTERY CO., LTD., Kosai (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 568 days.

(21) Appl. No.: 17/879,632

(22) Filed: Aug. 2, 2022

(65) Prior Publication Data

US 2023/0044496 A1 Feb. 9, 2023

(30) Foreign Application Priority Data

Aug. 6, 2021 (JP) ................. 2021-129714

(51) Int. Cl.
*H01M 10/48* (2006.01)
*G01R 31/3835* (2019.01)
(Continued)

(52) U.S. Cl.
CPC ...... *H01M 10/482* (2013.01); *G01R 31/3835* (2019.01); *G01R 31/392* (2019.01);
(Continued)

(58) Field of Classification Search
CPC ............ G01R 31/3835; G01R 31/392; H01M 10/4207; H01M 10/425; H01M 10/4285; H01M 10/441; H01M 10/482; H01M 2010/4271; H01M 2010/4278; H01M 2220/20; H01M 50/204; H01M 50/249;
(Continued)

(56) References Cited

U.S. PATENT DOCUMENTS

2001/0035737 A1 11/2001 Nakanishi et al.
2010/0194398 A1 8/2010 Kawasumi et al.
(Continued)

FOREIGN PATENT DOCUMENTS

JP 2003-109670 A 4/2003

OTHER PUBLICATIONS

Extended European Search Report dated Jan. 10, 2023 as received in Application No. 22188333.3.

*Primary Examiner* — Victoria H Lynch
(74) *Attorney, Agent, or Firm* — Maschoff Brennan

(57) ABSTRACT

A method is for replacing a rechargeable battery that is considered as an unsatisfactory rechargeable battery that needs replacing in an assembled battery in which rechargeable batteries are stacked and restrained in a row and electrically connected in series or in parallel. The method includes removing of finding at least one of the rechargeable batteries to be an unsatisfactory rechargeable battery in the assembled battery and removing the unsatisfactory rechargeable battery, and installing a satisfactory rechargeable battery, which has little deterioration, on at least one end of the row of the rechargeable batteries, in a row direction, in the assembled battery from which the unsatisfactory rechargeable battery has been removed.

13 Claims, 7 Drawing Sheets

(51) Int. Cl.
*G01R 31/392* (2019.01)
*H01M 10/42* (2006.01)
*H01M 50/204* (2021.01)
*H02J 7/00* (2006.01)

(52) U.S. Cl.
CPC ....... *H01M 10/425* (2013.01); *H01M 50/204* (2021.01); *H02J 7/0013* (2013.01); *H02J 7/0048* (2020.01); *H02J 7/005* (2020.01); *H01M 2010/4271* (2013.01); *H01M 2010/4278* (2013.01)

(58) Field of Classification Search
CPC ............... H01M 50/264; H01M 50/284; H02J 7/0013; H02J 7/0048; H02J 7/005; Y02E 60/10
See application file for complete search history.

(56) References Cited

U.S. PATENT DOCUMENTS

| | | | | |
|---|---|---|---|---|
| 2011/0239445 A1* | 10/2011 | Ibi | ...................... | H01M 50/204 29/623.1 |
| 2013/0177791 A1* | 7/2013 | Takahashi | ........... | H01M 10/617 429/72 |
| 2018/0351144 A1 | 12/2018 | Huff | | |
| 2020/0161615 A1 | 5/2020 | Huff | | |

\* cited by examiner

METHOD FOR REPLACING RECHARGEABLE BATTERY

BACKGROUND

1. Field

The following description relates to a method for replacing a rechargeable battery, and more specifically, a method for removing an unsatisfactory battery from a used assembled battery and then installing a satisfactory battery to the assembled battery so that the assembled battery is reused.

2. Description of Related Art

In an electric vehicle and a hybrid electric vehicle (HEV), which includes an engine and an electric motor, a rechargeable battery is conventionally used as the main power supply for driving the electric motor. A nickel-metal hydride battery (NiMH battery) or a lithium-ion rechargeable battery is used from the point of its high energy density and high output density. In the rechargeable battery mounted on an electric vehicle or a hybrid electric vehicle, battery cells are connected in series or in parallel to form a battery block so that a sufficiently high voltage or high current is supplied to the electric motor. Further, battery blocks are combined to form a single assembled battery. The assembled battery is accommodated in a case to form a battery pack including a sensor and a controller. The battery pack is used when mounted on an electric vehicle or a hybrid electric vehicle.

The battery pack may be used for a long time if used in an appropriate environment. However, the rechargeable batteries of the assembled battery separately undergo deterioration such as capacity loss depending on the difference between rechargeable batteries, variations in the components in a rechargeable battery, and the ambient temperature. When an anomaly occurs in one of the rechargeable batteries in the assembled battery, the charging and discharging may vary between the rechargeable batteries, and the assembled battery may fail to normally function. This is highly likely to result in a system failure. Hence, conventionally, when an anomaly occurs in a rechargeable battery, the anomalous rechargeable battery is detected and quickly replaced.

In a conventional method, since an anomalous battery block is simply replaced, the properties of the assembled battery are not optimized after the replacement.

In this regard, Japanese Laid-Open Patent Publication No. 2003-109670 discloses an anomalous battery replacing method for replacing some of the rechargeable batteries that are detected to be anomalous in an assembled battery described below.

In an assembled battery in which battery blocks are arranged in a row, generally, the battery temperature is high in those located in a high-temperature region, which is a central part in the row direction, and the battery temperature is low in those located at ends. When the battery temperature is high, the internal resistance and the charging efficiency of the rechargeable batteries decrease. Therefore, the capacity of the battery blocks located in the central part of the assembled battery is prone to decrease. When an anomaly occurs in a rechargeable battery of the assembled battery and the anomalous rechargeable battery is to be replaced with a new battery, the new battery replaces a central battery block, the capacity of which has decreased the most. The arrangement of the new battery in the high-temperature region to replace the most deteriorated rechargeable battery diminishes the difference in function between the new battery and the other rechargeable batteries. This decreases variations in the properties of the rechargeable batteries in the assembled battery, thereby optimizing the properties of the assembled battery.

In a rechargeable battery, gas may be produced in a hermetic battery container by a side reaction and may increase the internal pressure of the battery container. Thus, the battery blocks that are in contact with end plates located at opposite ends of the assembled battery receive less restraining force than the battery blocks located at the central part in the row direction. As a result, the battery container is prone to swell, and the strength of wall surfaces of the battery container may be degraded with use of the assembled battery.

As disclosed in Japanese Laid-Open Patent Publication No. 2003-109670, when a new battery is arranged in the high-temperature region where the battery temperature is high and does not differ between the batteries, excluding regions near the opposite ends of the assembled battery, the rechargeable batteries arranged at the opposite ends of the assembled battery will never be replaced. With the method for replacing an anomalous battery as disclosed in Japanese Laid-Open Patent Publication No. 2003-109670, degradation of the strength of the wall surfaces of the battery container located at the opposite ends of the assembled battery is not limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a method is for replacing a rechargeable battery that is considered as an unsatisfactory rechargeable battery that needs replacing in an assembled battery in which rechargeable batteries are stacked and restrained in a row and electrically connected in series or in parallel. The method includes removing of finding at least one of the rechargeable batteries to be an unsatisfactory rechargeable battery in the assembled battery and removing the unsatisfactory rechargeable battery, and installing a satisfactory rechargeable battery, which has little deterioration, on at least one end of the row of the rechargeable batteries, in a row direction, in the assembled battery from which the unsatisfactory rechargeable battery has been removed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
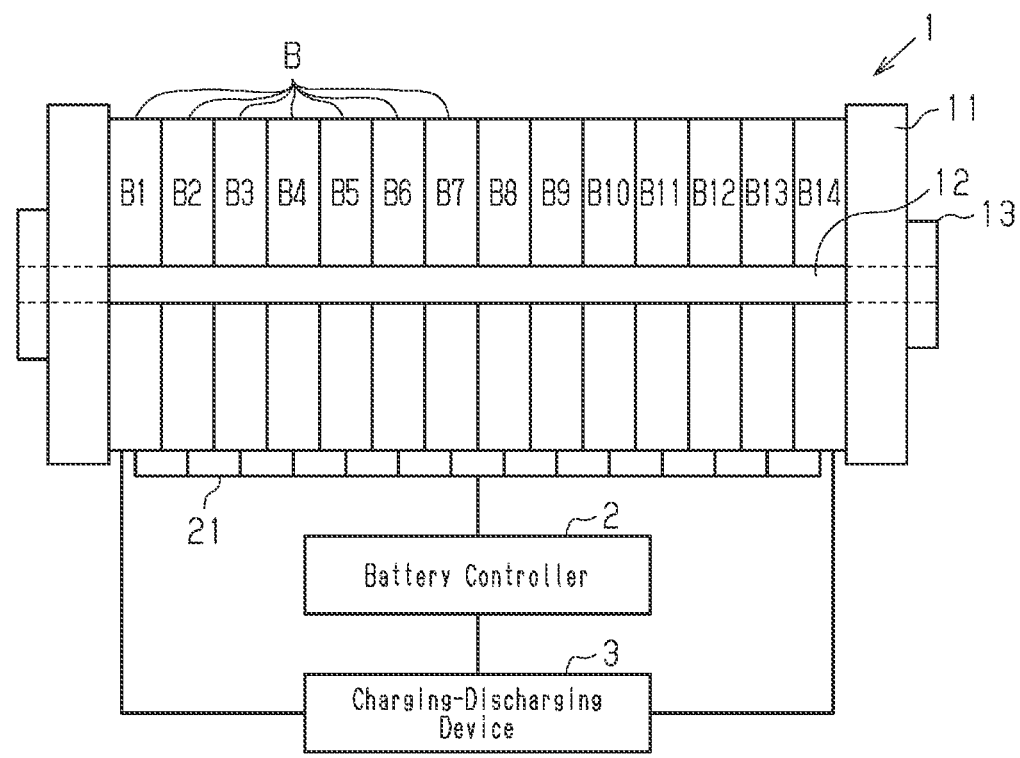
FIG. 1 is a schematic diagram showing an assembled battery.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A method for replacing a rechargeable battery according to the present disclosure will now be described with reference to FIGS. 1 to 9. In a first embodiment, an assembled battery 1 includes battery blocks B1 to B14, which are nickel-metal hydride batteries, and a method for replacing the battery blocks B in the assembled battery 1 will be described.

Battery Block B

A rechargeable battery such as a nickel-metal hydride battery is configured to repeat charging and discharging and is widely used from a precision electronic device to a power source for a vehicle. In the case of a precision electronic device, a battery cell is often used. When the battery has deteriorated, the battery cell is entirely replaced. In the case of a vehicle on-board rechargeable battery, a nickel-metal hydride battery or a lithium-ion rechargeable battery is used. Such a rechargeable battery is required to produce a high voltage and a high current for driving the vehicle and is used as an assembled battery in which a number of battery cells are connected in series or in parallel. As described in the beginning, deterioration differs between rechargeable batteries depending on not only variations of the rechargeable batteries but also the ambient temperature of each rechargeable battery. When the properties of the assembled battery 1 have deteriorated, if the assembled battery 1 is entirely replaced, the battery cells that have not deteriorated will be wasted. However, it is burdensome to separately monitor, control, and replace a number of battery cells.

In the rechargeable battery of the present embodiment, a fixed number of battery cells is referred to as "the battery block B" and is monitored, controlled, and replaced as a unit. The assembled battery is controlled and replaced per battery block B. In the present embodiment, a nickel-metal hydride battery is used as an example. A number of battery cells (e.g., six battery cells) are accommodated in an integral battery container to form a battery module, and multiple battery modules are stacked to form the battery block B.

Assembled Battery 1

FIG. 1 is a schematic diagram showing the structure of the assembled battery 1 in the present embodiment. A vehicle on-board battery pack (not shown) including the assembled battery 1 includes the battery blocks B, each of which is controlled as a unit. In an example, the present embodiment of the assembled battery 1 includes fourteen battery blocks B, namely, the battery blocks B1 to B14. In the description, the battery blocks B1 to B14 are referred to as "the battery blocks B" unless otherwise distinguished.

The battery blocks B1 to B14 are sequentially stacked. End plates 11 are disposed at opposite ends in a row direction of the battery blocks B1 to B14 to sandwich the battery blocks B1 to B14 in the row direction. The end plates 11 each include a hard planar member that presses the battery blocks B. In the assembled battery 1, two restraining rods 12 are arranged in a stacking direction of the battery blocks B and sandwich the battery blocks B1 to B14 in a width-wise direction. Opposite ends of each restraining rod 12 extend through the end plates 11. The opposite ends of the restraining rods 12 are threaded. The ends of the restraining rod 12 extend through the end plates 11 and engage with restraining nuts 13, thereby pressing the end plates 11. Thus, the battery blocks B1 to B14 are held by the two end plates 11 and restrained by pressure received from the two end plates 11. Although not shown, the battery blocks B1 to B14 are connected in series or in parallel and function as a single assembled battery 1.

Battery Pack

The battery blocks B are stacked to form the assembled battery 1. A single or multiple assembled batteries 1 are accommodated in the accommodation case of a battery pack.

As shown in FIG. 1, a sensor configured to separately monitor the battery blocks B1 to B14 and/or a battery controller 2 configured to separately control each battery block B is connected to the battery blocks B1 to B14 using connection lines 21. A cooling system or the like may be mounted on the vehicle on-board battery pack (not shown).

Battery Module Forming Battery Block B

Figure 9:
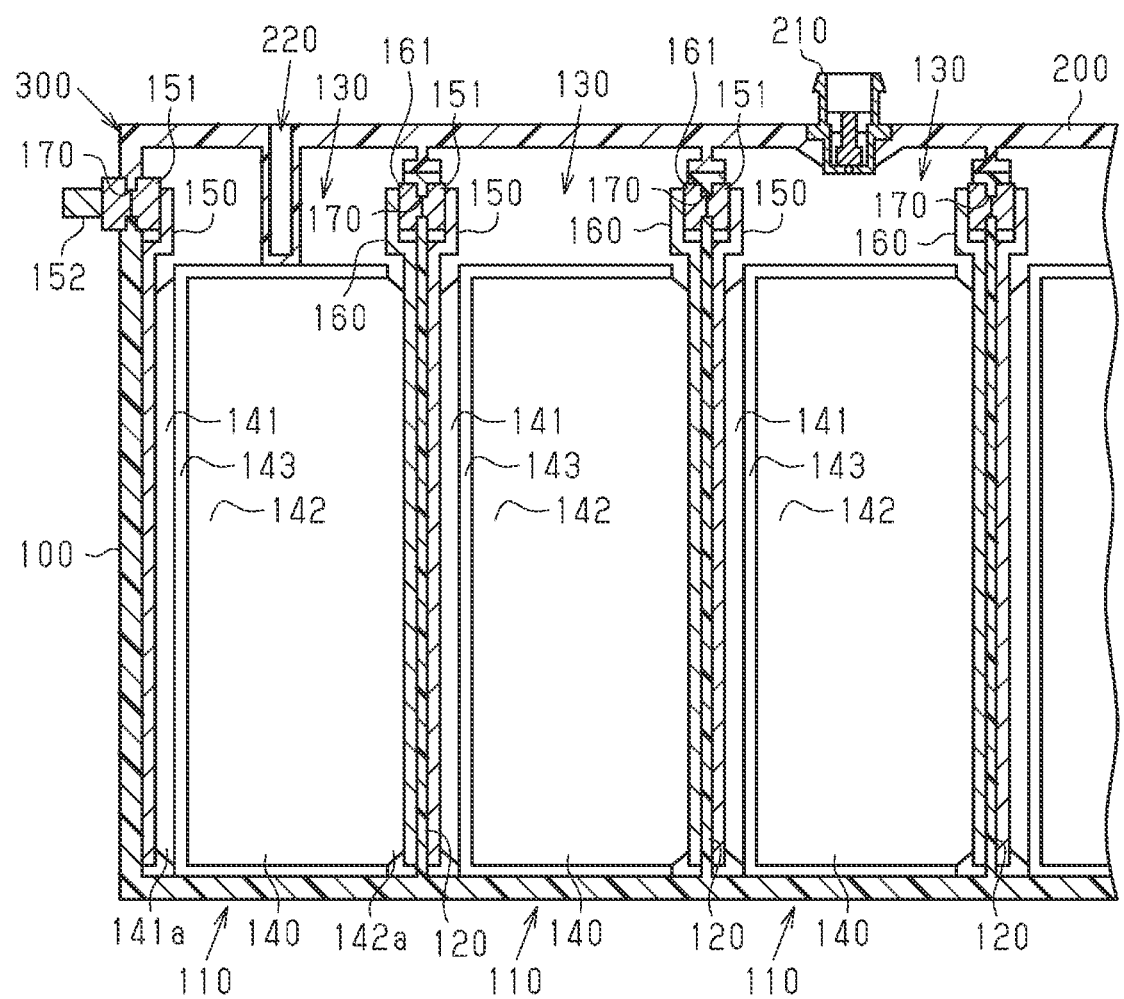
FIG. 9 is a cross-sectional partial view showing the structure of the nickel-metal hydride battery in the embodiment.

FIG. 9 is a cross-sectional partial view showing the structure of the nickel-metal hydride battery in the present embodiment. An example of a battery module of a nickel-metal hydride battery forming the present embodiment of the battery block B will now be described briefly.

As shown in FIG. 9, the nickel-metal hydride battery is a sealed battery and is used as a power supply for a vehicle such as an electric vehicle or a hybrid electric vehicle. A vehicle on-board nickel-metal hydride battery includes a sealed rectangular battery module in which battery cells 110 are connected in series in an integral battery container 100 to obtain a desired power capacity.

The battery module includes a rectangular case 300 having the form of a rectangular box. The rectangular case 300 includes the integral battery container 100 capable of accommodating the battery cells 110 and a lid 200 sealing the integral battery container 100. In an example, the rectangular case 300 is formed from resin.

The resin rectangular case 300 is light and has a superior insulation property as compared to a metal battery case. However, when the internal pressure increases, the resin rectangular case 300 deforms more easily than the metal battery case. Repetitive deformation of wall surfaces of the resin rectangular case 300 may apply loads on the wall surfaces. In this regard, as shown in FIG. 1, the battery modules are stacked, restrained, and pressed so that deformation of the wall surfaces of the resin rectangular case 300 is limited. In this configuration, it is confirmed by analysis that stress is applied to wall surfaces of the battery blocks B located at opposite ends in the row direction. Therefore, it is desirable that an unused battery block B, which has strong wall surfaces, be arranged at opposite ends in the row direction.

The integral battery container 100 of the rectangular case 300 is formed from a synthetic resin material that is resistant to an alkaline electrolyte, which is, for example, polypropylene or polyethylene. The battery cells 110 are separated by partition walls 120 arranged in the integral battery container 100. Each portion separated by the partition walls 120 defines a battery container 130 for each battery cell 110. The integral battery container 100 includes, for example, six battery containers 130. FIG. 9 shows four of the six battery containers 130.

Each of the battery containers 130, which are separated as described above, accommodates an electrode plate group 140, a positive current collector plate 150, and a negative current collector plate 160 together with the electrolyte. The positive current collector plates 150 and the negative current collector plates 160 are located at opposite sides of the electrode plate group 140.

The electrode plate group 140 is formed by stacking a rectangular positive plate 141 and a negative plate 142 on opposite sides of a separator 143. The direction in which the positive plate 141, the negative plate 142, and the separator 143 are stacked (direction orthogonal to the plane of FIG. 9) is referred to the stacking direction. The positive plate 141 and the negative plate 142 of the electrode plate group 140 project from opposite side portions in a planar direction (direction extending along the plane of FIG. 9) to define a lead portion 141a of the positive plate 141 and a lead portion 142a of the negative plate 142. The current collector plates 150 and 160 are bonded to side edges of the lead portions 141a and 142a, respectively.

Through holes 170 extend through an upper portion of each partition wall 120 to connect the battery containers 130. Two connection projections 151 and 161 respectively project from an upper portion of the current collector plate 150 and an upper portion of the current collector plate 160 and are welded to each other in the through holes 170. As a result, the electrode plate groups 140 of the battery containers 130 that are located adjacent to each other are electrically connected in series. A positive connection terminal 152 and a negative connection terminal (not shown) are attached to upper parts of side walls of the integral battery container 100 through the through holes 170 located at an outer side of the battery containers 130 located at opposite ends. The positive connection terminal 152 is welded to the connection projection 151 of the current collector plate 150. The negative connection terminal is welded to the connection projection 161 of the current collector plate 160. Thus, the total output of the electrode plate groups 140 that are connected in series, that is, the battery cells 110, is drawn out from the positive connection terminal 152 and a negative connection terminal 153.

The lid 200 of the rectangular case 300 includes an exhaust valve 210 and a sensor receptacle 220. The exhaust valve 210 is configured to set the internal pressure of the rectangular case 300 to be less than or equal to a valve opening pressure. The sensor receptacle 220 receives a sensor configured to detect the temperature of the electrode plate groups 140. The sensor receptacle 220 extends through the battery container 130 to the proximity of the electrode plate groups 140 so that the temperature of the electrode plate groups 140 is measurable.

The exhaust valve 210 is configured to maintain the internal pressure of the integral battery container 100 at an allowable threshold value or less. When the internal pressure is greater than or equal to the valve opening pressure that is greater than the allowable threshold value, the exhaust valve 210 opens to discharge gasses produced in the integral battery container 100. When the nickel-metal hydride battery is overcharged, gas may be produced by a side reaction and increase the internal pressure. When the internal pressure exceeds a certain threshold value, the exhaust valve 210 opens.

Even when the exhaust valve 210 is not actuated, increases in the internal pressure may repeatedly deform the wall surfaces of the resin rectangular case 300 and apply loads on the wall surfaces. In this regard, as shown in FIG. 1, the battery modules are stacked, restrained, and pressed to limit deformation of the wall surfaces of the resin rectangular case 300.

Positive Plate 141

The positive plate 141 is formed of a composite material layer that includes a positive substrate, which is formed of a three-dimensional porous nickel foamed body, and nickel hydroxide and cobalt, which are active materials and are applied to the positive substrate. Specifically, a conductive agent such as cobalt hydroxide or metallic cobalt powder is added to nickel hydroxide. In addition, if necessary, a thickener such as carboxymethyl cellulose and/or a binder such as polytetrafluoroethylene are added.

Negative Plate 142

The negative plate 142 includes, for example, a hydrogen absorbing alloy formed of mischmetal, nickel, aluminum, cobalt, and manganese as an active material. Mischmetal is a mixture of rare earth elements such as lanthanum, cerium, and neodymium.

Separator 143

The separator 143 may be a non-woven cloth of olefinic resin such as polypropylene. If necessary, the non-woven cloth may undergo a hydrophilic treatment such as sulfonation.

Main Reaction and Side Reaction of Nickel-Metal Hydride Battery

The main reaction of the active material in the nickel-metal hydride battery having the above configuration is expressed by equations (1) and (2).

$$\text{Positive Electrode: } Ni(OH)_2 + OH^- \leftrightarrow NiOOH + H_2O + e^- \quad (1)$$

$$\text{Negative Electrode: } M + H_2O + e^- \leftrightarrow MH + OH^-, \text{ where M denotes hydrogen storage alloy} \quad (2)$$

When electrolysis of water occurs, the reaction expressed by the following equation (3) occurs and produces oxygen at the positive electrode.

$$\text{Positive Electrode: } OH^- \rightarrow 1/4 O_2 + 1/2 H_2O + e^- \quad (3)$$

At the negative electrode, the reaction expressed by the following equation (4) occurs and produces hydrogen.

$$\text{Negative Electrode: } H_2O + e^- \rightarrow 1/2 H_2 + OH^- \quad (4)$$

It is also known that at a charge ending stage, the positive electrode provokes the reaction expressed by equation (1) and the oxygen generating reaction, which is a side reaction of equation (3).

As described above, the nickel-metal hydride battery produces gases depending on the condition. The produced gases increase the internal pressure and repeatedly deform the wall surfaces of the resin rectangular case 300. As a result, loads may be applied on the wall surfaces.

Figure 2:
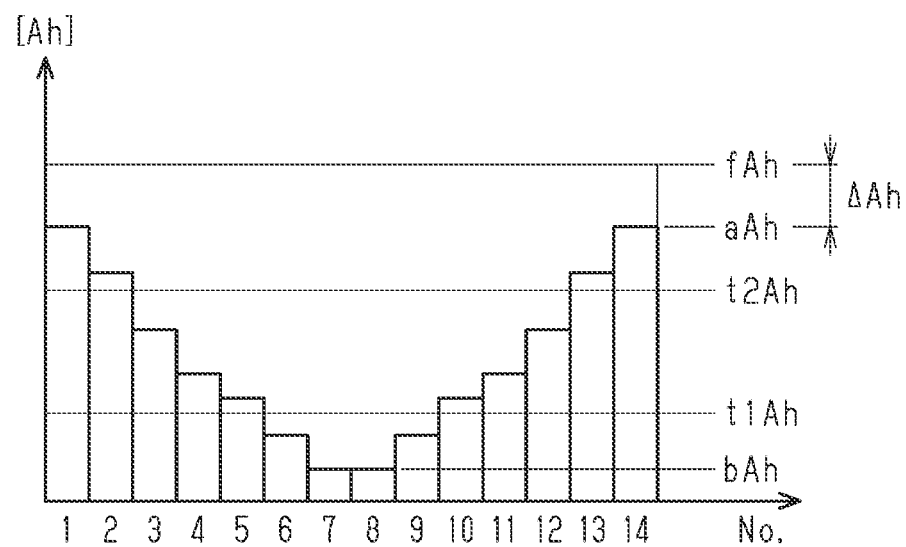
FIG. 2 is a conceptual diagram showing an example of decreases in the capacity of batteries that have been used.

Nickel-Metal Hydride Battery and Deterioration Caused by Temperature Environment FIG. 2 is a conceptual diagram showing an example of a decrease in the capacity of each battery block B, which is a nickel-metal hydride battery, in the used assembled battery 1. The vertical axis indicates the battery capacity [Ah] of the battery blocks B1 to B14. The horizontal axis indicates the battery number [No.] of the battery blocks B1 to B14. In general, the central part of the assembled battery 1 has a low battery cooling efficiency and is likely to increase in temperature. This facilitates deterioration of the battery caused by the internal temperature. In FIG. 2, the reference capacity fAh refers to the battery capacity [Ah] of a satisfactory rechargeable battery GB that is unused and has not deteriorated and is in a fully charged state. The deterioration state is indicated by the battery capacity [Ah] of the used battery blocks B1 to B14 in comparison to the reference capacity fAh. As shown in FIG. 2, the battery blocks B7 and B8, which are located in the central part, have deteriorated the most. The battery capacity [Ah] of the battery blocks B7 and B8 is the smallest capacity bAh. The battery capacity [Ah] of the battery blocks B1 and B14, which are located at opposite ends and have deteriorated the least, is the largest capacity aAh. The difference between the largest capacity aAh and the reference capacity fAh is indicated by a capacity difference ΔAh. The capacity of the remaining battery blocks B2 to B6 and B9 to B13 gradually decreases from the ends toward the central part of the assembled battery 1.

Battery Controller 2

As shown in FIG. 1, the connection lines 21 separately connect the battery blocks B1 to B14 of the assembled battery 1 to the battery controller 2. The battery controller 2 is configured to be a computer that includes a CPU, a ROM, a RAM, storage, and an interface. Although not shown in detail, each of the battery blocks B1 to B14 is provided with sensors that measure voltage and temperature, and the assembled battery 1 is provided with a sensor that measures the current of the assembled battery 1. The battery controller 2 is configured to obtain the voltage value and the temperature of each of the battery blocks B1 to B14 and the current value of the assembled battery 1. In addition, the assembled battery 1 is connected to a charging-discharging device 3 configured to charge and discharge the assembled battery 1. Thus, the battery controller 2 is configured to control the charging-discharging device 3 to charge and discharge the assembled battery 1. The battery controller 2 is configured to estimate SOC of the battery blocks B1 to B14, measure the battery capacity, and calculate the internal resistance based on the obtained voltage, current, and temperature. The battery controller 2 and the charging-discharging device 3 of the present embodiment are used as a device for replacing a rechargeable battery in the present embodiment.

Rechargeable Battery Replacing Process

Figure 3:
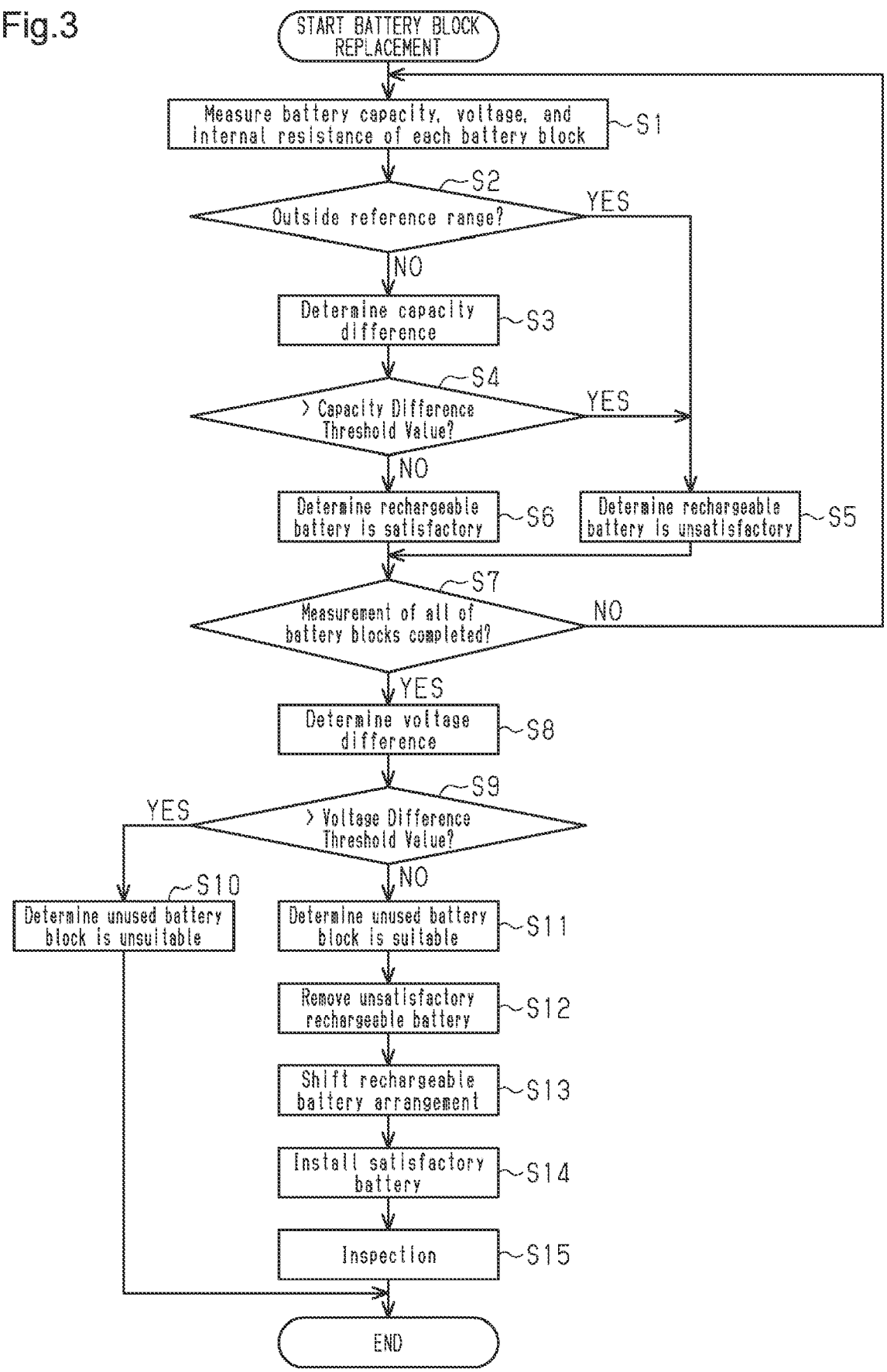
FIG. 3 is a flowchart showing a process for replacing a battery block in an assembled battery.

FIG. 3 is a flowchart showing a process for replacing the battery block B, which is a nickel-metal hydride battery, in the assembled battery 1.

Prior to a start of the process for replacing the battery block B of the assembled battery 1, as a preparation step, the capacity difference graph G1 (refer to FIG. 4) is stored in the storage of the battery controller 2 as a reference table. The capacity difference graph G1 is created when a capacity difference data obtaining step is executed. The capacity difference data obtaining step obtains capacity difference data that includes the capacity difference graph G1, which shows the correlation of an obtained measurement capacity xAh of the battery block B with the capacity difference ΔAh between the battery capacity (reference capacity fAh) of the satisfactory rechargeable battery GB and the obtained measurement capacity xAh of the battery block B.

Also, a voltage difference graph G2 (refer to FIG. 5) is stored in the storage of the battery controller 2 as a reference table. The voltage difference graph G2 is created when a voltage difference data obtaining step is executed. The voltage difference data obtaining step obtains voltage difference data that includes the voltage difference graph G2, which shows the correlation of the obtained measurement capacity xAh of the battery block B with a voltage difference ΔV between the voltage of the satisfactory rechargeable battery GB and an obtained voltage of the battery block B.

When the preparations are completed, the process of replacing a rechargeable battery is started (battery block replacement is started). When the process is started, the battery capacity, voltage, and internal resistance of each battery block is measured (S1).

The battery blocks B1 to B14 are sequentially processed from B1 to B14. Steps S1 to S6 are performed on the battery block B1. When the process for the battery block B1 is completed, the process has not been completed for all of the battery blocks (S7: NO) and returns to step S1. Steps S1 to S6 are performed on the battery block B2. When steps S1 to S6 are performed on the battery block B14, that is, the process has been completed for all of the battery blocks (S7: YES), a voltage difference determination step (S8) is executed. Steps S1 to S6 will be described below.

Measurement of Battery Capacity, Voltage, and Internal Resistance of Each Battery Block (S1)

In the measurement of the battery capacity, voltage, and internal resistance of each battery block (S1), the battery capacity [Ah], the voltage [V], and the internal resistance [Ω] of the battery blocks B1 to B14 are sequentially measured from the battery block B1 to B14. In the first step, the battery controller 2 executes charging and discharging with the charging-discharging device 3 to obtain a voltage value and a current value of the battery block B1 from the voltage sensor and the current sensor and measure the battery capacity [Ah], the voltage [V], and the internal resistance [Ω] of the battery block B1.

To obtain the battery capacity [Ah], a total discharge amount [Ah] is measured when the battery controller 2 fully charges the assembled battery 1 to a 100% of State of Charge (SOC) and discharges the assembled battery 1 to 0% of SOC. This step corresponds to capacity measurement according to the present disclosure.

To obtain the voltage [V], voltage [V] is measured when the battery controller 2 fully charges the assembled battery 1 to 100% of SOC.

To obtain the internal resistance [Ω], the battery controller 2 outputs pulsed current to measure the internal resistance from the voltage [V] and the current [A].

Determination Based on Reference Range (S2)

The battery controller 2 determines whether the measured values are inside or outside a reference range based on predetermined threshold values of satisfactory/unsatisfactory battery blocks (S2). The determination is based on the battery capacity [Ah], the voltage [V], and the internal resistance [Ω] of each of the battery blocks B1 to B14 obtained in the measuring step of the battery capacity, voltage, and internal resistance of each battery block (S1). This step corresponds to an unsatisfactory voltage determination and an unsatisfactory capacity determination according to the present disclosure.

In the determination based on the reference range (S2), when any one of the battery capacity [Ah], the voltage [V], and the internal resistance [Ω] is outside the reference range (S2: YES), it is not preferable to continue to use the battery block B in regard to the life of the assembled battery 1. Since the battery block B already shows a sign of deterioration, the battery block B is subject to replacement. In this case, the battery controller 2 determines that the battery block B is an unsatisfactory rechargeable battery BB (S5), stores it in the storage of the battery controller 2, and proceeds to the process for the next battery block B (S7: NO→S1).

In the present embodiment, the determination is made based on the battery capacity [Ah], the voltage [V], and the internal resistance [Ω]. Instead, the determination may be made based on one or two of the battery capacity [Ah], the voltage [V], and the internal resistance [Ω], for example, based on only the battery capacity. Alternatively, the determination may be made using other references.

Capacity Difference Determination (S3)

When all of the battery capacity [Ah], the voltage [V], and internal resistance [Ω] are inside the reference range (S2: NO), the battery controller 2 executes a capacity difference determination step (S3). This step corresponds to an unsatisfactory capacity difference determination according to the present disclosure.

To execute the capacity difference determination step, the battery controller 2 has obtained the capacity difference graph G1 (FIG. 4), which shows the correlation of the measurement capacity xAh of the battery block B, which is obtained in advance in the capacity difference data obtaining step, with the capacity difference ΔAh between the measurement capacity xAh of the battery block B and the satisfactory rechargeable battery GB. The battery controller 2 estimates the capacity difference ΔAh between the battery capacity xAh of the battery block B, which is the determination subject, and the battery capacity fAh of the satisfactory rechargeable battery GB based on the measurement capacity xAh of the determination subject with reference to the capacity difference graph G1. In this step, the battery capacities [Ah] are compared using battery capacities [Ah] when SOC is changed from 0% to 100%.

The determination of the battery capacity [Ah] in step S2 is based on an absolute value of the battery capacity of a battery block B that is subject to determination. Step S3 differs from step S2 in that the battery capacity [Ah] is determined based on the capacity difference ΔAh between the battery capacity xAh of a battery block B that is subject to determination and the reference capacity fAh of the satisfactory rechargeable battery GB based on the battery capacity xAh of the battery block B, that is, the determination subject.

Diagnosis

In recent years, many vehicles such as electric vehicles include an electronic control unit (ECU) that includes a computer to control the vehicle and execute self-diagnosis of a failure in the vehicle. The ECU executes a diagnosis program for each failure diagnosis subject item (diagnosis item) to determine whether the failure diagnosis execution condition (diagnosis condition) of the item is satisfied. The ECU executes a failure diagnosis process on each item when the condition is satisfied. The ECU also monitors and controls the vehicle on-board battery pack and the like. When the failure diagnosis execution condition is satisfied, for example, the ECU issues a warning to the driver or executes a predetermined correction program that restricts the use of the battery.

As shown in FIG. 2, for example, the capacity difference ΔAh between the reference capacity fAh and the smallest battery capacity bAh of the battery blocks B7 and B8 among the battery blocks B of the assembled battery 1 may be excessively large. In this case, as compared to the battery capacity of the battery blocks B, the reference capacity fAh is too large to charge and discharge all of the battery blocks B under the same condition. Thus, the diagnosis issues a warning to the driver as a failure such that the battery pack is difficult to control or executes a program that protects the battery pack.

In an example, when the capacity difference ΔAh is excessively large in the assembled battery 1, the diagnosis issues a warning to the driver as a failure such that the charging and discharging of the battery pack is difficult to control or executes a program that protects the battery pack. This may result in restriction on the controlling of the battery pack.

Capacity Difference Graph G1

Figure 4:
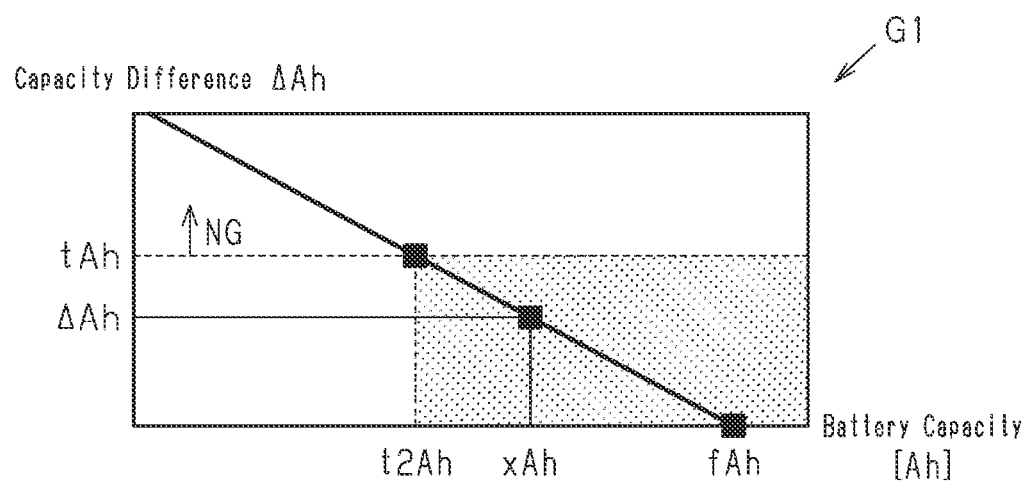
FIG. 4 is a graph showing the relationship of the battery capacity of a used rechargeable battery with the difference in capacity between the used rechargeable battery and a satisfactory rechargeable battery.

FIG. 4 is the capacity difference graph G1 showing the relationship of the battery capacity Ah of the used battery block B with the capacity difference ΔAh between the reference capacity fAh of the satisfactory rechargeable battery GB and the battery capacity Ah of the battery block B. The capacity difference graph G1 is stored in the storage of the battery controller 2 as a conversion table. As described above, the battery controller 2 has obtained the measurement capacity xAh of the battery block B that is subject to determination in the step of measuring the battery capacity, voltage, and internal resistance of each battery block (S1). The battery controller 2 uses the capacity difference graph G1 to convert the obtained measurement capacity xAh into the capacity difference ΔAh between the battery capacity xAh of the battery block B and the reference capacity fAh of the satisfactory rechargeable battery GB. The battery controller 2 compares the obtained capacity difference ΔAh with a capacity difference threshold value tAh (S4). If the obtained capacity difference ΔAh is greater than or equal to the capacity difference threshold value tAh (S4: YES), there is a possibility that desirable control cannot be executed when the battery block B is installed on any position of the assembled battery 1. This may lead to execution of the above-described diagnosis. Therefore, such a battery block B is considered in advance as a replacement subject. In this case, the battery controller 2 determines that the battery block B is an unsatisfactory rechargeable battery BB (S5), stores the determination result in the storage of the battery controller 2, and proceeds to the process for the next battery block B (S7: NO→S1).

Satisfactory Rechargeable Battery Determination (S6)

If the obtained capacity difference ΔAh is less than the capacity difference threshold value tAh (S4: NO), desirable control is performed when the battery block B is installed on any position of the assembled battery 1.

That is, since the battery capacity, voltage, and internal resistance are inside the reference range (S2: YES) and the capacity difference ΔAh is less than the threshold value, the battery controller 2 determines that the battery block B is a satisfactory rechargeable battery (S6) and stores the determination result in the storage of the battery controller 2.

Completion of Unsatisfactory/Satisfactory Rechargeable Battery Determination

If the unsatisfactory/satisfactory rechargeable battery determination of the battery block B is completed for each of the battery blocks B1 to B14 (S7: YES), a voltage difference determination (S8) is executed.

Voltage Difference Determination (S8)

The voltage difference determination (S8) is executed to determine whether an unused battery block B can be used as a replacement for a battery block B. Since the unused battery block B has a fixed quality, has not deteriorated, and has a large battery capacity, it is preferred that the unused battery block B is used as a replacement for a battery block B. In addition, quantities of unused battery blocks B are easily ensured.

However, when the unused battery block B is installed as a replacement satisfactory rechargeable battery GB, if the voltage difference ΔV between the unused battery block B and a used battery block B located adjacent to the unused battery block B is excessively large, the charging and discharging is difficult to control. When the voltage difference ΔV between the unused battery block B and the used battery block B located adjacent to the unused battery block B is excessively large, the vehicle may fail to function normally due to a diagnosis function of the vehicle.

In this regard, the voltage difference determination (S8) determines whether the unused battery block B can be used as a replacement for a battery block B.

To execute the voltage difference determination (S8), the voltage difference graph G2 (FIG. 5) is in advance obtained and stored in the storage of the battery controller 2. The voltage difference graph G2 shows the correlation of the measurement capacity xAh of the battery block B obtained in the voltage difference data obtaining step with the voltage difference ΔV between the battery block B and the satisfactory rechargeable battery GB. The battery controller 2 estimates the voltage difference ΔV between the satisfactory rechargeable battery GB and the battery block B that is subject to determination based on the measurement capacity xAh of the determination subject. In this step, the voltages [V] are compared at 100% of SOC.

In step S2, the voltage [V] is determined based on the absolute value of a battery block B that is to be determined. In contrast, the voltage difference determination (S8) differs from step S2 in that the voltage [V] is determined based on the voltage difference ΔV between an unused satisfactory rechargeable battery GB and a battery block B that is subject to determination, which is estimated based on the battery capacity xAh of the battery block B subject to determination.

Voltage Difference Graph G2

Figure 5:
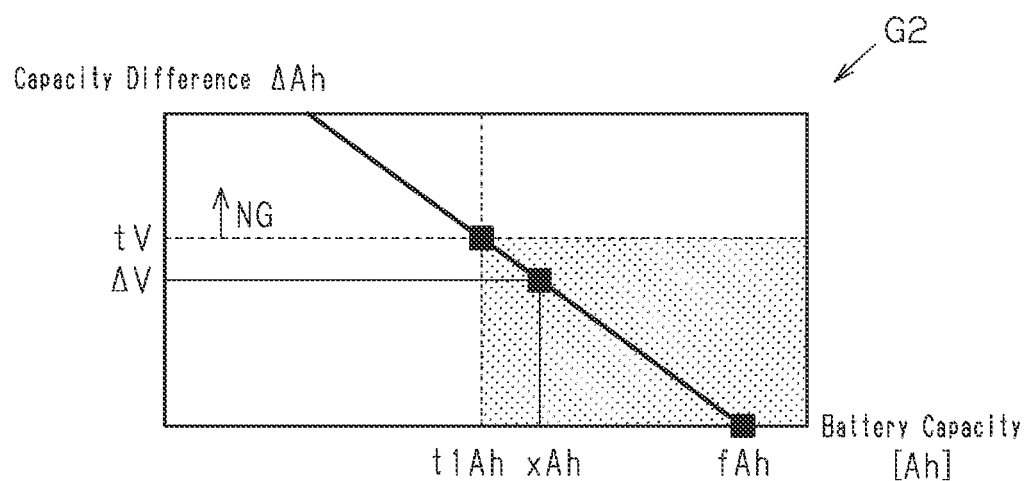
FIG. 5 is a graph showing the relationship of the battery capacity of a used rechargeable battery with the difference in voltage between the used rechargeable battery and a satisfactory rechargeable battery.

FIG. 5 is the voltage difference graph G2 showing the relationship between the battery capacity Ah of a used battery block B with the voltage difference ΔV in the voltage [V] between the used battery block B and the satisfactory rechargeable battery GB. The voltage difference graph G2 is stored in the storage of the battery controller 2 as a conversion table. As described above, the battery controller 2 has obtained the measurement capacity xAh of the battery block B that is subject to determination in the step of measuring the battery capacity, voltage, and internal resistance of each battery block (S1). The battery controller 2 uses the voltage difference graph G2 to convert the obtained measurement capacity xAh into the voltage difference ΔV in the voltage [V] between the battery block B and the satisfactory rechargeable battery GB.

Determination Based on Voltage Difference Threshold Value tV (S9)

The battery controller 2 selects the battery block B having the largest battery capacity [Ah] among the battery blocks B1 to B14. As shown in FIG. 2, as in the present embodiment, decreases in the capacity are typically small in the battery blocks B located at opposite ends of the assembled battery 1 in the row direction of the battery blocks B1 to B14. In the present embodiment, the battery capacity xAh of the battery block B1 or the battery block B14 is stored.

The battery controller 2 uses the voltage difference graph G2 to convert the obtained measurement capacity xAh into the voltage difference ΔV in the voltage [V] between the battery block B and the satisfactory rechargeable battery GB.

The battery controller 2 compares the obtained voltage difference ΔV with the voltage difference threshold value tV.

Case where Voltage Difference ΔV is Greater than or Equal to Voltage Difference Threshold Value tV (S9: YES)

If the obtained voltage difference ΔV is greater than or equal to the voltage difference threshold value tV (S9: YES), when the battery block B is disposed adjacent to the satisfactory rechargeable battery GB, desirable control cannot be executed. This may lead to execution of the above-described diagnosis.

Thus, in this case, the battery controller 2 determines that the battery block B is unsuitable for an unused battery block (S10) and ends the process for replacing the battery block (proceeds to END).

In this case, the replacement battery block B is changed to a battery block B that has been used so as to have a decreased capacity or a battery block B that initially has a decreased capacity. The reference capacity fAh is reset in the battery controller 2, and the process for replacing the battery block is executed again.

Case where Voltage Difference ΔV is less than Voltage Difference Threshold Value tV (S9: NO)

If the obtained voltage difference ΔV is less than the voltage difference threshold value tV (S9: NO), the control is desirably executed even when the battery block B is disposed adjacent to the unused satisfactory rechargeable battery GB. As a result, the above-described diagnosis will not be executed. Such a battery block B is determined to be "unsuitable for an unused battery block" and be continuously usable (S11). This determination allows an unused satisfactory rechargeable battery to be used in the satisfactory rechargeable battery installing step (S14).

In the installation of the replacement battery block B (S14), the replacement battery block B needs to be installed so as to be disposed adjacent to the battery block B that is the subject of the voltage difference determination (S8) (in the present embodiment, the battery block B14).

Battery Block B Determined to be Unsuitable for Unused Battery Block

The battery block B determined to be unsuitable for an unused battery block (S10) cannot be disposed adjacent to the unused satisfactory rechargeable battery GB. However, when the battery block B is used so as to have a decreased battery capacity and the voltage difference ΔV becomes less than the voltage difference threshold value tV, the battery block B can be used as a replacement.

When such a battery block B is installed and the method for replacing the battery block of the present embodiment is executed in the voltage difference determination (S8), an unused battery block B may be allowed to be disposed adjacent to the used battery block B.

Unsatisfactory Rechargeable Battery Removal (S12)

Figure 6A:
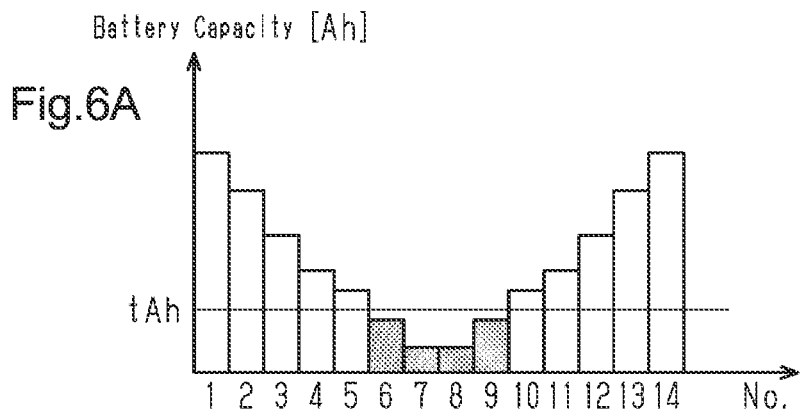
FIG. 6A is a schematic diagram of an assembled battery for showing a step of replacing rechargeable batteries of the present embodiment in which battery blocks B6 to B9 are considered as unsatisfactory rechargeable batteries.
Figure 6B:
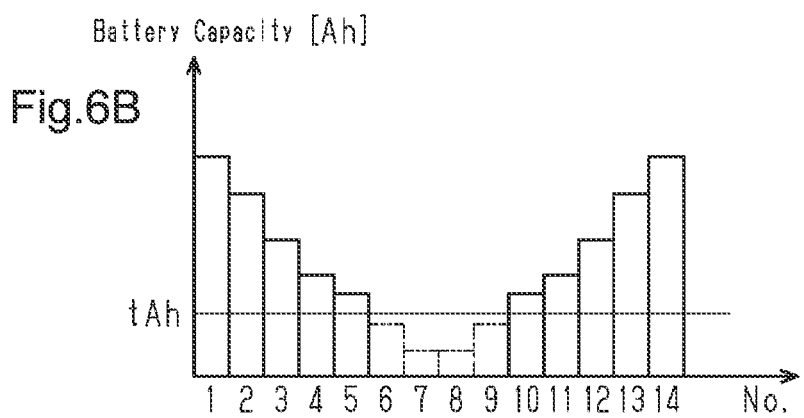
FIG. 6B is a schematic diagram of the assembled battery for showing a step of replacing rechargeable batteries of the present embodiment when the unsatisfactory rechargeable batteries are removed from an assembled battery 1.
Figure 6C:
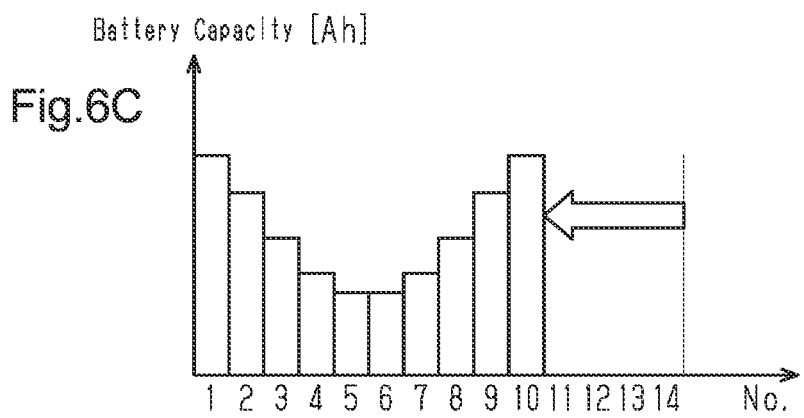
FIG. 6C is a schematic diagram of the assembled battery for showing a step of replacing rechargeable batteries of the present embodiment when the arrangement of the remaining battery blocks B after removal of the unsatisfactory rechargeable batteries is shifted in the assembled battery 1.
Figure 6D:
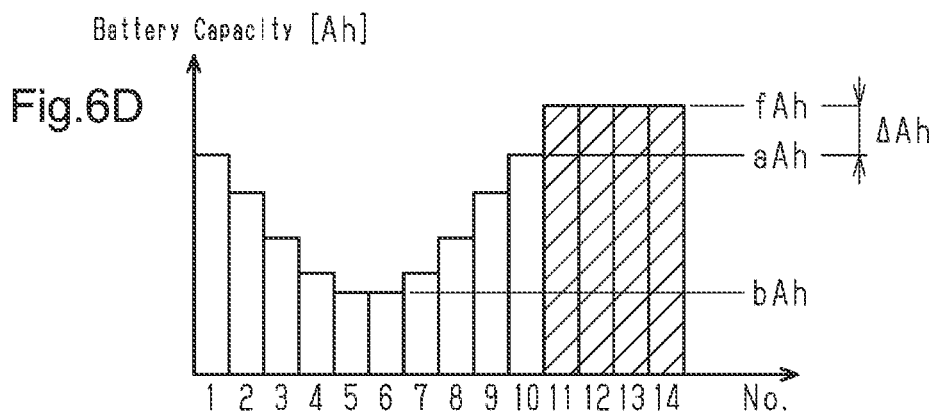
FIG. 6D is a schematic diagram of the assembled battery for showing a step of replacing rechargeable batteries of the present embodiment when satisfactory batteries are installed.

FIGS. 6A to 6D are schematic diagrams of the assembled battery 1 for showing the steps of replacing rechargeable batteries in the present embodiment. FIG. 6A shows that the battery blocks B6 to B9 are determined to be unsatisfactory rechargeable batteries. FIG. 6B shows the assembled battery 1 from which the unsatisfactory rechargeable batteries BB have been removed. FIG. 6C shows that after removal of the unsatisfactory rechargeable batteries BB, the arrangement of the remaining battery blocks B is shifted in the assembled battery 1. FIG. 6D shows that the satisfactory rechargeable batteries GB are installed.

In the unsatisfactory rechargeable battery removal (S12), the battery blocks B that are determined to be an unsatisfactory rechargeable battery BB in the unsatisfactory rechargeable battery determination step (S5) and are stored in the storage of the battery controller 2 are physically removed from the battery blocks B1 to B14.

As shown in FIG. 6A, the determination result showing the battery blocks B determined to be unsatisfactory rechargeable batteries BB is stored in the storage of the battery controller 2 (S5). In the present embodiment, as shown in FIG. 2, the battery capacity of the battery blocks B6, B7, B8, and B9 is less than a voltage difference threshold value t1Ah. Thus, in the capacity difference determination (S3), the capacity difference ΔAh of the battery blocks B6, B7, B8, B9 is greater than or equal to the capacity difference threshold value tAh (S4: YES). The determination result showing the battery blocks B6, B7, B8, B9 determined to be unsatisfactory rechargeable batteries BB is stored in the storage of the battery controller 2 (S7).

Referring to FIG. 1, the restraining nuts 13 are loosened to release tension exerted on the end plates 11 by the restraining rods 12. In addition, the wires are removed where appropriate.

As shown in FIG. 6B, when the battery blocks B are released from the restraint, the battery blocks B6, B7, B8, and B9, which are considered as the unsatisfactory rechargeable batteries BB, are physically removed (S12).

Rechargeable Battery Arrangement Shift (S13)

As shown in FIG. 6C, the rechargeable battery arrangement is shifted (S13). In the rechargeable battery arrangement shift (S13), among the battery blocks B of the assembled battery 1 from which the battery blocks B6 to B9 have been removed, the battery blocks B10 to B14 maintain the same arrangement and are shifted to where the battery blocks B6 to B9 were originally disposed. As a result, an empty space is formed in a position where the battery blocks B10 to B14 were originally disposed.

In the present embodiment shown in FIG. 6D, the battery arrangement shift is executed so that, in the row of the battery blocks B of the assembled battery 1 from which the unsatisfactory rechargeable batteries BB have been removed, the satisfactory rechargeable battery GB having little deterioration is installed on at least one end in the row direction. The satisfactory rechargeable battery GB having little deterioration is disposed at one end in the row direction of the battery blocks B in the assembled battery 1, thereby disposing the battery block B with the battery container having a strong wall surface.

When the satisfactory rechargeable battery GB having little deterioration is disposed at one end in the row direction, the difference in capacity between adjacent battery blocks B needs to be small. In this regard, it is preferred that battery blocks B having a uniform battery capacity be disposed. In the present embodiment, the satisfactory rechargeable batteries GB are unused and thus have a uniform battery capacity fAh. In addition, among the battery blocks B used in the assembled battery 1, the battery blocks B having the largest battery capacity are the battery blocks B1 and B14, which are located at opposite ends in the row direction.

Therefore, in the present embodiment, it is desirable that the satisfactory rechargeable battery GB be disposed at one end in the row direction. In other words, in the present embodiment, it is desirable to dispose the satisfactory rechargeable battery GB at one end of the row of the battery blocks B of the assembled battery 1. It is desirable that the difference in capacity between adjacent battery blocks B be small. The battery blocks B1 and B14 initially disposed at opposite ends in the row direction have the largest battery capacity. The above-described conditions will be satisfied when replenishing satisfactory rechargeable batteries GB are four satisfactory rechargeable batteries GB that are arranged next to each other and are disposed at one end in the row direction. The battery blocks B10 to B14 maintain the same arrangement and are shifted to where the battery blocks B6 to B9 were originally disposed so that the four satisfactory rechargeable batteries GB are arranged next to each other at one end in the row direction.

Satisfactory Battery Installation (S14)

The four satisfactory rechargeable batteries GB are successively installed in the empty space formed by the rechargeable battery arrangement shift (S13) where the battery blocks B11 to B14 were originally disposed. Then, referring to FIG. 1, the restraining nuts 13 are fastened so that tension exerted by the restraining rods 12 is applied to the end plates 11. Consequently, the battery blocks B1 to B14 are pressed and restrained in the row direction. In this state, the wall surfaces of battery modules forming the battery block B are in contact with each other. This cancels out bulging forces and restricts bulging of the wall surfaces of the battery modules. Wires are laid out for the battery blocks B1 to B14 where appropriate. The assembled battery 1 is reformed. This completes the satisfactory battery installation (S14).

Inspection (S15)

The assembled battery 1, assembled as described above, undergoes inspections of the battery voltage, the battery capacity, and the internal resistance as an assembled battery. When passing the inspections, the assembled battery 1 is reused as a reformed battery pack.

The battery replacing process of the present embodiment has been described above.

Operation of Present Embodiment

Wall Surface Strength

In the present embodiment, the satisfactory rechargeable battery GB is disposed at an end of the assembled battery 1 in the row direction to contact the end plate 11. The wall surface of the battery case of the battery block B contacting the end plate 11 is newer and has less wear than the other battery blocks B.

The replacement battery block B, the wall surface of which is the strongest and is resistant to breakage, is disposed at a side that receives a large external shock. This resists breakage of the stack caused by the external shock.

Capacity Difference

In the capacity difference determination (S3), when the capacity difference ΔAh between a battery block B and the replacement satisfactory rechargeable battery GB is large, the battery block B is determined to be an unsatisfactory rechargeable battery BB.

In the capacity difference determination (S3) and the determination of whether the capacity difference is greater than or equal to the capacity difference threshold value (S4), the battery block B that is to be replaced is appropriately selected. With this configuration, even in a vehicle including an ECU configured to execute conventional diagnosis, the battery block B may be replaced without an anomaly warning actuated by the diagnosis.

Voltage Difference

In the voltage determination step (S8) and the step of determining whether the voltage difference is greater than or equal to the voltage difference threshold value tV (S9), when some of the battery blocks B are replaced in the assembled battery 1, it is determined whether the voltage difference ΔV from an adjacent battery block B is greater than or equal to the predetermined voltage difference threshold value tV. If the voltage difference ΔV is greater than the voltage difference threshold value tV, it is determined that an unused satisfactory battery block GB cannot be used as a replacement in the assembled battery 1. In the voltage determination (S8) and the determination of whether the voltage difference is greater than or equal to the voltage difference threshold value tV (S9), the battery block B that is to be replaced is appropriately selected. With this configuration, even in a vehicle including an ECU configured to execute conventional diagnosis, the battery block B may be replaced without an anomaly warning actuated by the diagnosis.

When the voltage difference ΔV from the unused satisfactory battery block GB is greater than the voltage difference threshold value tV, a used battery block B, the battery capacity [Ah] of which is decreased so that the voltage difference ΔV is less than the voltage difference threshold value tV, needs to be prepared as a replacement satisfactory rechargeable battery GB.

Replacement Task

When the unused battery blocks B are disposed at one end of the assembled battery 1 in the row direction, the non-replaced battery blocks B1 are disposed at the other end. Hence, during maintenance, the battery capacity may be checked in only the battery blocks B1 disposed at the other end.

With the present embodiment of the method for replacing battery blocks B, which are nickel-metal hydride batteries, in the assembled battery 1, the battery blocks B may be replaced without largely changing the arrangement of the battery blocks B in the assembled battery 1 from the original arrangement.

In addition, when the replacement battery blocks B are disposed at only a side of the assembled battery 1 opposite from the ECU having a complex structure, the replacement task is readily performed.

Effects of First Embodiment (1-1) In the present embodiment, the satisfactory rechargeable battery GB is disposed at an end of the assembled battery 1 in the row direction to contact the end plate 11. Thus, the wall surface of the battery container of the battery block B contacting the end plate 11 is newer and has less wear than the other battery blocks B.

The replacement battery block B, the wall surface of which is the strongest and is resistant to breakage, is disposed at a side that receives a large external shock. This resists breakage of the stack caused by the external shock.

(1-2) In the capacity difference determination (S3) and the determination of whether the capacity difference is greater than or equal to the capacity difference threshold value (S4), when the capacity difference ΔAh between a battery block B and the replacement satisfactory rechargeable battery GB is large, the battery block B is determined to be an unsatisfactory rechargeable battery BB in the capacity difference determination (S3). Thus, the battery block B that is to be replaced is appropriately selected. With this configuration, even in a conventional vehicle including an ECU configured to execute diagnosis, the battery block B may be replaced without an anomaly warning actuated by the diagnosis.

(1-3) In the voltage determination step (S8) and the step of determining whether the voltage difference is greater than or equal to the voltage difference threshold value (S9), when some of the battery blocks B are replaced in the assembled battery 1, it is determined whether the voltage difference ΔV from an adjacent battery block B is greater than or equal to the predetermined voltage difference threshold value tV. If the voltage difference ΔV is greater than the voltage difference threshold value tV, it is determined that an unused satisfactory battery block GB cannot be used as a replacement in the assembled battery 1. Thus, when controlling the charging and discharging, the battery controller 2 appropriately controls the charging and discharging of all of the battery blocks B.

(1-4) In the voltage determination (S8) and the determination of whether the voltage difference is greater than or equal to the voltage difference threshold value tV (S9), the battery block B that is to be replaced is appropriately selected. With this configuration, even in a vehicle including an ECU configured to execute conventional diagnosis, the battery block B may be replaced without an anomaly warning actuated by the diagnosis.

(1-5) When the voltage difference ΔV from the unused satisfactory battery block GB is greater than the voltage difference threshold value tV, a used battery block B, the battery capacity [Ah] of which is decreased so that the voltage difference ΔV is less than the voltage difference threshold value tV, is used as a replacement satisfactory rechargeable battery GB.

This configuration allows an unused battery block B to be used as a replacement. Thus, when there is shortage of used satisfactory rechargeable batteries GB, the use of the used satisfactory rechargeable batteries GB is reduced.

(1-6) In this case, a used battery block B having a decreased battery capacity [Ah] so that the voltage difference ΔV is less than the voltage difference threshold value tV, is used as the replacement satisfactory rechargeable battery GB. If the voltage difference determination (S8) is executed in this state, the voltage difference ΔV from the unused satisfactory battery block GB is less than the voltage difference threshold value tV, and the unused satisfactory battery block GB may be used.

(1-7) With the present embodiment of the method for replacing battery blocks B, which are nickel-metal hydride batteries, of the assembled battery 1, the battery blocks B may be replaced without largely changing the arrangement of the battery blocks B in the assembled battery 1 from the original arrangement.

(1-8) The unused battery blocks B are disposed at one end of the assembled battery 1 in the row direction of the battery blocks B1 to B14, and the non-replaced battery blocks B1 are disposed at the other end. This simplifies the maintenance because the battery capacity may be checked in only the battery blocks B1 disposed at the other end.

(1-9) In addition, when the replacement battery blocks B are disposed at only a side of the assembled battery 1 opposite from the ECU having a complex structure, the replacement task is readily performed.

(1-10) The present embodiment of the method for replacing the battery block B in the assembled battery 1 may be executed without special equipment.

(1-11) The assembled battery 1 that has been used to have a decreased capacity is efficiently reformed without wasting.

Second Embodiment

The second embodiment differs from the first embodiment only in the rechargeable battery arrangement shift step (S13) and the satisfactory rechargeable battery installing step (S14). The differences will be mainly described.

Figure 7A:
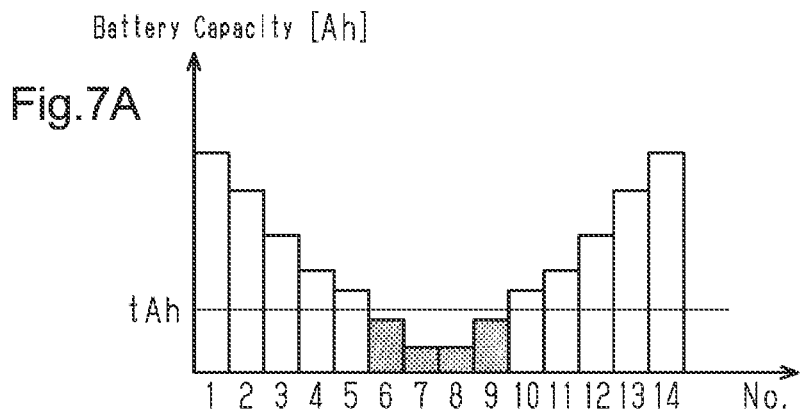
FIG. 7A is a schematic diagram showing a step of replacing rechargeable batteries of another embodiment in which battery blocks B6 to B9 are considered as unsatisfactory rechargeable batteries.
Figure 7B:
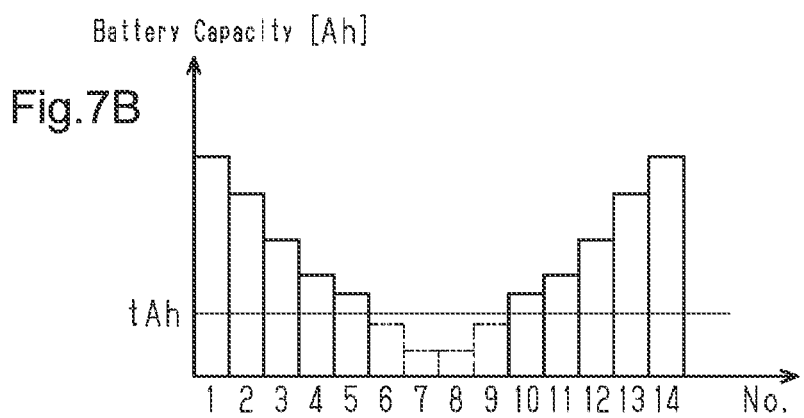
FIG. 7B is a schematic diagram for showing a step of replacing rechargeable batteries of the embodiment when the unsatisfactory rechargeable batteries are removed from an assembled battery 1.
Figure 7C:
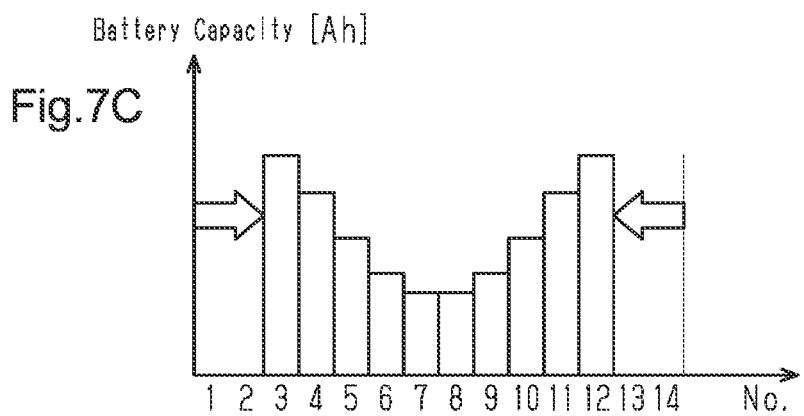
FIG. 7C is a schematic diagram for showing a step of replacing rechargeable batteries of the embodiment when the arrangement of the remaining battery blocks B after removal of the unsatisfactory rechargeable batteries is shifted in the assembled battery 1.
Figure 7D:
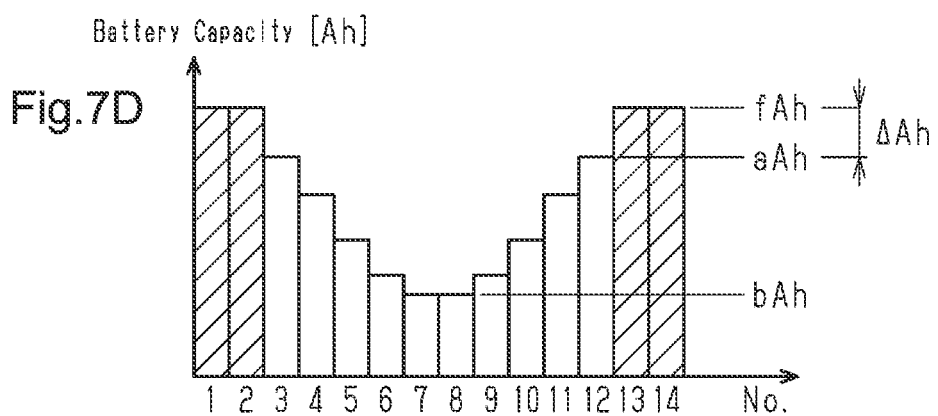
FIG. 7D is a schematic diagram for showing a step of replacing rechargeable batteries of the embodiment when satisfactory batteries are installed.

FIGS. 7A to 7D are schematic diagrams of the assembled battery for showing the steps of replacing rechargeable batteries in the second embodiment. FIG. 7A shows that the battery blocks B6 to B9 are determined to be unsatisfactory rechargeable batteries. FIG. 7B shows the assembled battery 1 from which the unsatisfactory rechargeable batteries are removed. FIG. 7C shows that after removal of the unsatisfactory rechargeable batteries, the arrangement of the remaining battery blocks B is shifted in the assembled battery 1. FIG. 7D shows that the satisfactory batteries are installed. In comparison with FIGS. 6A to 6D, FIG. 7A is identical to FIG. 6A, and FIG. 7B is identical to FIG. 6B. Until this step, the replacing of the rechargeable battery of the second embodiment is performed with the same steps as that of the first embodiment.

In the rechargeable battery arrangement shift step (S13), in the first embodiment, in order to clear one end in the row direction, the battery blocks B that are considered as satisfactory rechargeable batteries GB are shifted to the other end. In contrast, in the second embodiment shown in FIG. 7C, the battery blocks B that are considered as satisfactory rechargeable batteries GB are shifted to the central part to clear the opposite ends in the row direction. Consequently, empty spaces are formed where the battery blocks B1, B2, B13, and B14 were originally disposed. In the satisfactory rechargeable battery installing step (S14) shown in FIG. 7D, replenishing battery blocks B are installed on the original positions of the battery blocks B1, B2, B13, and B14.

Operation and Effects of Second Embodiment (2-1) The same effects as the effects (1-1) to (1-7) and (1-10) to (1-11) of the first embodiment are produced.

(2-2) In addition, in the second embodiment, the satisfactory rechargeable batteries GB are disposed at opposite ends of the assembled battery 1 in the row direction of the battery blocks B1 to B14 to contact the end plates 11. Thus, the wall surface of the battery container of each battery block B contacting the end plate 11 is newer and has less wear than the other battery blocks B.

The replacement battery blocks B, the wall surface of which is the strongest and is resistant to breakage, are disposed at opposite outer sides that receive a large external shock. This resists breakage of the stack caused by the external shock.

Third Embodiment

Figure 8A:
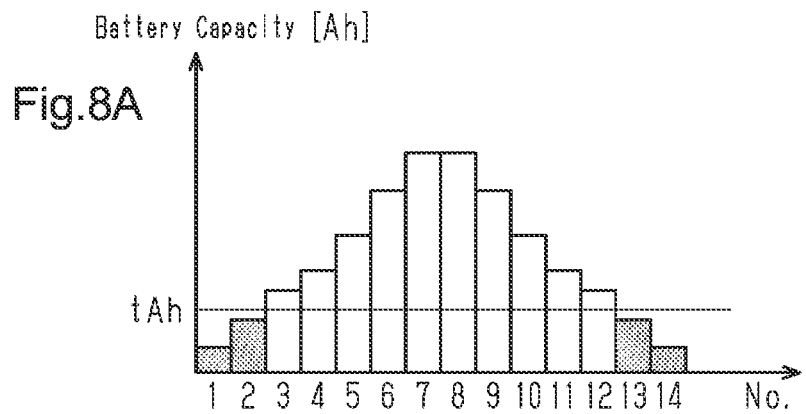
FIG. 8A is a schematic diagram showing a step of replacing rechargeable batteries of another embodiment in which battery blocks B1, B2, B13, and B14 are considered as unsatisfactory rechargeable batteries.
Figure 8B:
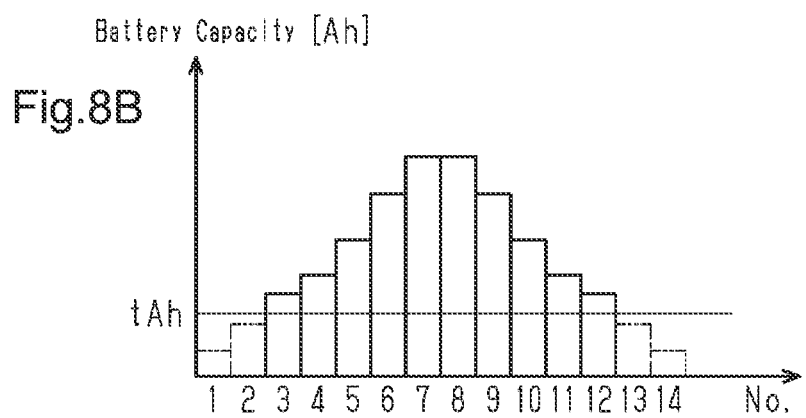
FIG. 8B is a schematic diagram for showing a step of replacing rechargeable batteries of the embodiment when the unsatisfactory rechargeable batteries are removed from an assembled battery 1.
Figure 8C:
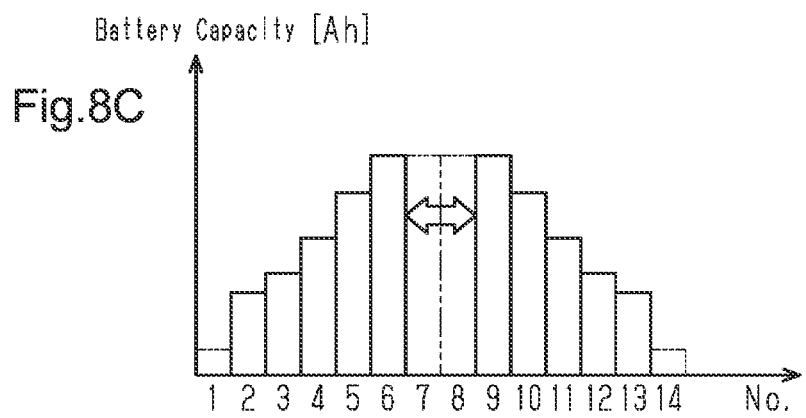
FIG. 8C is a schematic diagram for showing a step of replacing rechargeable batteries of the embodiment when the arrangement of the remaining battery blocks B after removal of the unsatisfactory rechargeable batteries is shifted in the assembled battery 1.
Figure 8D:
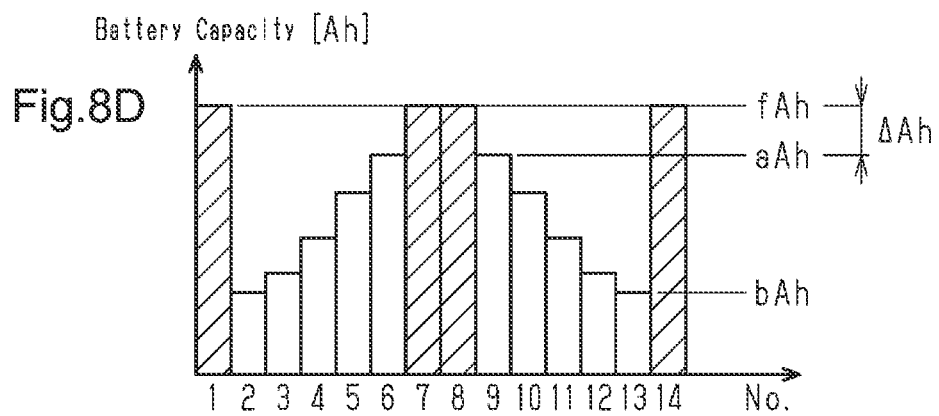
FIG. 8D is a schematic diagram for showing a step of replacing rechargeable batteries of the embodiment when satisfactory batteries are installed.

FIGS. 8A to 8D are schematic diagrams of the assembled battery for showing the steps of replacing rechargeable batteries in the third embodiment. FIG. 8A shows that the battery blocks B1, B2, B13, and B14 are determined to be unsatisfactory rechargeable batteries. FIG. 8B shows the assembled battery 1 from which the unsatisfactory rechargeable batteries are removed. FIG. 8C shows that after removal of the unsatisfactory rechargeable batteries, the arrangement of the remaining battery blocks B is shifted in the assembled battery 1. FIG. 8D shows that the satisfactory batteries are installed.

In the first and second embodiments, among the battery blocks B1 to B14 of the assembled battery 1, decreases in the battery capacity of those disposed at the central part are large, and decreases in the battery capacity of those disposed at opposite ends are small. However, decreases in the battery capacity are affected by the cooling system of the battery pack and the like. In the third embodiment, among the battery blocks B1 to B14 of the assembled battery 1, decreases in the battery capacity of those located at opposite ends are large, and decreases in the battery capacity of those located at the central part are small.

In such a case, as shown in FIG. 8A, in the capacity difference determination step (S3), it is determined that the battery blocks B1, B2, B13, and B14 disposed at opposite ends in the row direction have a capacity that is less than the battery capacity [Ah] obtained from the capacity difference threshold value tAh. Thus, the battery blocks B1, B2, B13, and B14 are determined to be unsatisfactory rechargeable batteries BB.

In the unsatisfactory rechargeable battery removal step (S12) shown in FIG. 8B, the battery blocks B1, B2, B13, and B14, which are unsatisfactory rechargeable batteries BB, are removed.

Next, the rechargeable battery arrangement shift step (S13) is executed. As a first condition of the rechargeable battery arrangement shift, the priority for disposing replenishing battery blocks B may be given to a position contacting the end plates 11 located at opposite ends in the row direction. When the replacement battery blocks B, the wall surface of which is the strongest and is resistant to breakage, are disposed at opposite outer sides that receive a large external shock, breakage of the stack caused by the external shock is limited.

As a second condition, after the battery blocks B are disposed at opposite ends in the row direction, a subsequent battery block is disposed adjacent to the battery block B having the largest capacity among the remaining battery blocks B. Such disposition decreases the voltage difference ΔV between the new battery block B and the remaining the battery block B adjacent to the new battery block B. More specifically, as shown in FIG. 8C, the battery block B having the largest capacity is the battery block B7 and the battery block B8 (in this example, the same capacity). The battery block B7 and the battery block B8 are separated to form an empty space so that replenishing battery blocks B are disposed adjacent to the battery block B7 and the battery block B8. That is, the battery blocks B3 to B7 are shifted to the left in FIG. 8C to become the battery blocks B2 to B6. Also, the battery blocks B8 to B12 are shifted to the right in FIG. 8C to become the battery blocks B9 to B13.

As shown in FIG. 8D, the replacement battery blocks B are installed in the positions of the battery blocks B1, B7, B8, and B14.

Operation and Effects of Third Embodiment (3-1) In the third embodiment, the priority for disposing a replacement battery block is given to the opposite ends of the assembled battery 1 in the row direction of the battery blocks B1 to B14 regardless of the battery capacity. Thus, the satisfactory rechargeable batteries GB are disposed at opposite ends of the assembled battery 1 in the row direction of the battery blocks B1 to B14 to contact the end plates 11. The wall surface of the battery container of each battery block B contacting the end plate 11 is newer and has less wear than the other battery blocks B.

The replacement battery blocks B, the wall surface of which is the strongest and is resistant to breakage, are disposed at opposite outer sides that receive a large external shock. This resists breakage of the stack caused by the external shock.

As shown in FIG. 8D, the capacity difference, that is, the voltage difference, between the battery block B1 and the battery block B2, which are adjacent to each other, is increased. In the third embodiment, priority is given to the strength against external shocks.

Although not shown in the drawings, the capacity of the battery blocks B forming the assembled battery 1 may decrease in various modes. However, a method such as that described in the third embodiment allows for an arrangement that balances strength against external shocks and smooth charging-discharging control.

MODIFIED EXAMPLES

In the embodiments, fourteen battery blocks B, that is, the battery blocks B1 to B14, are combined to form the assembled battery 1. However, the number of battery blocks is not limited.

In the embodiments, a nickel-metal hydride battery is used as an example. A number of battery cells (e.g., six battery cells) are accommodated in an integral battery container to form a battery module, and a stack of multiple (e.g., two) battery modules is referred to as "the battery block B". However, the present disclosure is not limited to such a configuration and may be optimized by one skilled in the art in accordance with the type or usage of rechargeable battery.

In the embodiments, the battery block B is a nickel-metal hydride battery obtained by stacking multiple (e.g., six) battery modules. Alternatively, the battery block B may include, for example, a single battery cell of a lithium-ion rechargeable battery, and each battery cell may be monitored, controlled, and replaced as a unit.

In an example, a single battery module may be used as "the battery block B". In this case, multiple battery modules may be stacked to form "the assembled battery 1".

In an example, in a lithium-ion rechargeable battery or a solid-state battery, when each battery cell is controlled and replaced, the battery cell forms "the battery block B". In this case, multiple battery cells are stacked to form "the assembled battery 1". In a battery pack, each stack may be used as "the battery block B", and multiple stacks may be combined to form "the assembled battery 1".

The capacity difference graph G1 shown in FIG. 4 and the voltage difference graph G2 shown in FIG. 5 are conceptual graphs that illustrate the invention and are used as maps as reference data. The storage of the battery controller 2 may store a mathematical expression showing each relationship and execute conversion using the expression. Alternatively, corresponding numerical values may be added to a chart and converted as a conversion table.

In the embodiments, the rechargeable battery is a nickel-metal hydride battery but may be another alkaline rechargeable battery. The present invention is applicable to a rechargeable battery that forms an assembled battery such as a non-aqueous rechargeable battery, for example, a lithium-ion rechargeable battery, or a solid-state rechargeable battery.

In the embodiments, the battery pack is formed of multiple assembled batteries 1 but may be formed of a single assembled battery 1.

In the embodiments, the rechargeable battery is an assembled battery 1 for a vehicle. However, the present invention may be applied to a battery configured to be mounted on a ship or an aircraft. Moreover, the present invention may be applied to a stationary battery.

FIG. 3 is a flowchart showing an example of the steps for replacing a rechargeable battery. The steps may be added, deleted, changed, or reordered.

In the embodiments, in the step of measuring the battery capacity, voltage, and internal resistance of each battery block (S1), each of the battery capacity, voltage, and internal resistance is measured and determined whether the value is satisfactory or unsatisfactory (S2). However, any one of the battery capacity, voltage, and internal resistance or other inspection items, for example, internal pressure, charging efficiency, micro-short circuit, or liquid leakage may be determined. The step of measuring the battery capacity, voltage, and internal resistance of each battery block (S1) may be omitted.

In the present embodiment, after the measurement of the battery capacity, voltage, and internal resistance of each battery block (S1) and the capacity difference determination (S3), the voltage difference determination (S8) is executed. The order of the steps may be changed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for replacing a rechargeable battery that is considered as an unsatisfactory rechargeable battery that needs replacing, when at least one of battery parameters of the rechargeable battery does not satisfy a criterion of the at least one of battery parameters, in an assembled battery in which rechargeable batteries are stacked and restrained in a row and electrically connected in series or in parallel, the method comprising:

identifying at least one of the rechargeable batteries to be the unsatisfactory rechargeable battery in the assembled battery and removing the unsatisfactory rechargeable battery;

shifting the rechargeable batteries remaining in the assembled battery to form a space on at least one end of the row of the rechargeable batteries, in a row direction, in the assembled battery from which the unsatisfactory rechargeable battery has been removed; and installing a satisfactory rechargeable battery, battery parameters of which each satisfy the criterion, on the at least one end of the row of the rechargeable batteries, in the row direction, in the assembled battery from which the unsatisfactory rechargeable battery has been removed, wherein each of the rechargeable batteries has a battery container that is formed from resin, and two end plates are disposed at opposite ends in the row direction of the stacked rechargeable batteries to sandwich the stacked rechargeable batteries in the row direction, wherein:

in the row of rechargeable batteries in the assembled battery from which the unsatisfactory rechargeable battery has been removed, the installing includes selecting and installing a satisfactory rechargeable battery so as to be disposed adjacent to one of the rechargeable batteries in the assembled battery from which the unsatisfactory rechargeable battery has been removed so that a difference in capacity between the satisfactory rechargeable battery and the adjacent on of the rechargeable batteries is less than a predetermined threshold value, and the selecting and installing includes:

determining whether the difference in capacity between the satisfactory rechargeable battery, which is an unused rechargeable battery, and the adjacent on of the rechargeable batteries is less than the predetermined threshold value;

installing the satisfactory rechargeable battery, which is the unused rechargeable battery, when the difference in capacity between the satisfactory rechargeable battery, which is the unused rechargeable battery, and the adjacent one of the rechargeable batteries is less than the predetermined threshold value; and determining that the satisfactory rechargeable battery, which is the unused rechargeable battery, is unsuitable when the difference in capacity between the satisfactory rechargeable battery, which is the unused rechargeable battery, and the adjacent of the rechargeable batteries is greater than or equal to the predetermined threshold value.

2. The method according to claim 1, wherein the installing includes installing the satisfactory rechargeable battery on only one end of the rechargeable batteries in the assembled battery in the row direction.

3. The method according to claim 1, wherein the satisfactory rechargeable battery is one of satisfactory rechargeable batteries, the installing includes installing satisfactory rechargeable batteries on opposite ends of the rechargeable batteries in the assembled battery in the row direction.

4. The method according to claim 1, wherein in the row of the rechargeable batteries in the assembled battery from which the unsatisfactory rechargeable battery has been removed, the installing includes installing a satisfactory rechargeable battery other than the satisfactory rechargeable battery disposed at the end so as to be disposed adjacent to one of the rechargeable batteries having least deterioration in a predetermined one of the battery parameters among the rechargeable batteries in the assembled battery from which the unsatisfactory rechargeable battery has been removed.

5. The method according to claim 1, wherein in the row of the rechargeable batteries in the assembled battery from which the unsatisfactory rechargeable battery has been removed, the installing includes selecting and installing a satisfactory rechargeable battery so that a difference in capacity between the satisfactory rechargeable battery and a most deteriorated one of the rechargeable batteries in the assembled battery from which the unsatisfactory rechargeable battery has been removed is less than a predetermined threshold value.

6. The method according to claim 1, wherein the removing includes measuring a voltage of each of the rechargeable batteries in the assembled battery and determining that the rechargeable battery is an unsatisfactory rechargeable battery when the measured voltage is less than a predetermined threshold value.

7. The method according to claim 1, further comprising obtaining voltage difference data in advance prior to the removing, wherein the voltage difference data shows a correlation of a capacity of the rechargeable battery with a voltage difference between the rechargeable battery and a satisfactory rechargeable battery, wherein the removing includes measuring a battery capacity of each of the rechargeable batteries in the assembled battery, and determining that the rechargeable battery is an unsatisfactory rechargeable battery when the measured capacity is less than or equal to a capacity that corresponds to the voltage difference being greater than a predetermined threshold value based on the voltage difference data.

8. The method according to claim 7, wherein the obtaining voltage difference data in advance includes storing the voltage difference data in storage of a controller in advance, the voltage difference data includes reference data including a map, a table, or a mathematical expression, and
the removing includes executing control with the controller with reference to the reference data.

9. The method according to claim 1, wherein the removing includes measuring a battery capacity of each of the rechargeable batteries in the assembled battery and determining that the rechargeable battery is an unsatisfactory rechargeable battery when the measured battery capacity is less than a predetermined threshold value.

10. The method according to claim 1, further comprising obtaining capacity difference data in advance prior to the removing, wherein the capacity difference data shows a correlation of a capacity of the rechargeable battery with a capacity difference between the rechargeable battery and a satisfactory rechargeable battery, wherein
the removing includes
measuring a battery capacity of each of the rechargeable batteries in the assembled battery, and
determining that the rechargeable battery is an unsatisfactory rechargeable battery when the measured capacity is less than or equal to a capacity that corresponds to the capacity difference being greater than a predetermined threshold value based on the capacity difference data.

11. The method according to claim 10, wherein
the obtaining capacity difference data in advance includes storing the capacity difference data in storage of a controller in advance,
the capacity difference data includes reference data including a map, a table, or a mathematical expression, and
the removing includes executing control with the controller with reference to the reference data.

12. The method according to claim 1, wherein
the assembled battery includes a controller configured to control the rechargeable batteries,
the rechargeable batteries include a battery block that includes battery cells, and
the controller controls the rechargeable batteries per battery block.

13. The method according to claim 1, wherein the rechargeable batteries include an alkaline rechargeable battery.

* * * * *